United States Patent

Olia

[11] Patent Number: 5,809,943
[45] Date of Patent: Sep. 22, 1998

[54] DEVICE FOR PRECONTROLLING THE FEEDWATER OF A COOLING-AIR TEMPERATURE CONTROLLER FOR A COOLING-AIR COOLER

[75] Inventor: Hamid Olia, Wallisellen, Switzerland

[73] Assignee: Asea Brown Boveri AG, Baden, Switzerland

[21] Appl. No.: 856,031

[22] Filed: May 14, 1997

[51] Int. Cl.[6] .................................. F22D 5/26; F02C 6/00
[52] U.S. Cl. .................................. 122/451.5; 122/451.2; 60/39.182
[58] Field of Search .................. 122/451.5, 451 R, 122/451.1, 451.2; 60/39.182, 39.29; 62/173

[56] References Cited

U.S. PATENT DOCUMENTS

| 2,659,350 | 11/1953 | Swartwout, III et al. | 122/451.2 |
| 3,175,541 | 3/1965 | Hottenstine | 122/451 S |
| 3,828,738 | 8/1974 | Frei | 122/451.5 |
| 4,351,633 | 9/1982 | Ortner et al. | 432/77 |
| 4,541,365 | 9/1985 | Jennings et al. | 122/451 R |
| 5,390,505 | 2/1995 | Smith et al. | 62/173 |
| 5,463,873 | 11/1995 | Early et al. | 62/173 |
| 5,491,971 | 2/1996 | Tomlinson et al. | 60/39.182 |

FOREIGN PATENT DOCUMENTS

| 0178750A3 | 4/1986 | European Pat. Off. |
| 08135407 | 5/1996 | Japan. |
| WO82/02583 | 8/1982 | WIPO. |

*Primary Examiner*—Henry A. Bennett
*Assistant Examiner*—Gregory A. Wilson
*Attorney, Agent, or Firm*—Burns, Doane, Swecker & Mathis, L.L.P.

[57] ABSTRACT

The device for precontrolling the feedwater quantity of a cooling-air temperature controller (1) for a once-through cooling-air cooler (2) in combined power plant systems comprises a function element which has as inputs the signals corresponding to the air-outlet desired temperature ($\Theta_{a\,soll}$), the air-inlet temperature ($\Theta_e$), the air volume flow (M), the main steam pressure (p) and the water-inlet temperature ($\theta_e$), and as outputs the signals of the approximated precontrolled feedwater volume flow ($m_{FFO}$) and the controller gain (VR). A correcting quantity depending on the load (L) and the ambient temperature ($T_U$) is additionally introduced for operation in the unsaturated temperature range.

4 Claims, 5 Drawing Sheets

DEVICE FOR PRECONTROLLING THE FEEDWATER OF A COOLING-AIR TEMPERATURE CONTROLLER FOR A COOLING-AIR COOLER

BACKGROUND OF THE INVENTION

1. Field of the Invention

The invention relates to the field of power plant engineering. It relates to a device for precontrolling the feedwater quantity of a cooling-air temperature controller for a cooling-air cooler, in particular a once-through cooling-air cooler, which is used in power plant systems (combination systems or gas turbines with a single cycle).

2. Discussion of Background

It has so far been usual in the case of gas turbines with a single cycle to cool the compressed or precompressed air removed from the compressor by injecting water or applying external cooling before feeding said air as cooling air to the cooling system of the turbine.

EP 0591 304 A1 discloses a method for operating a gas turbine in which the cooling air is used to generate steam and in the process is itself cooled before entry into the gas turbine. For this purpose, a heat exchanger is connected, on the primary side, into a cooling-air line connecting the air compressor and the gas turbine and, on the secondary side, into a liquid-steam line.

It is known in the case of combined power plant systems that the air is cooled by water in an air/water heat exchanger and the heat produced by the cooling of the cooling air is rendered useful again in the power plant system. As coolers, use is made of so-called once-through gas turbine coolers, that is to say a once-through forced-flow cooler, in which the water flows in tubes from bottom to top or from top to bottom, and in the process is heated and evaporated, depending on the temperature conditions, and the cooling air (compressed or precompressed air which has been heated because of the compression) flows along the tubes on the outside in the counter-flow direction, being cooled in the process.

In devices so far known for controlling the cooling-air temperature of such cooling-air coolers for power plant systems, the feedwater quantity is controlled as a function of load. Arranged for this purpose in the feedwater line of the cooling-air cooler is a feedwater volume flow meter which sets the feedwater quantity via a PID controller, for example by adjusting the rotational speed of the feed pump or by adjusting a valve built into the feedwater line (see DE-A 1 526 208, for example).

It is the cooling-air temperature, which is detected by a temperature meter and is likewise connected to the PID controller together with a corresponding desired temperature value, which is controlled. It is also possible to control the enthalpy instead of the cooling-air temperature. Finally, a load-dependent signal, which comes from a function generator in which the relationship between the feedwater volume flow and the load (for example fuel quantity to be fed or heat to be fed) is fixed, acts on the feed control loop as a precontrol. In this case, an adjustable element in which a dynamic deformation of the load-dependent signal is performed (lead-lag element) is connected between the function generator and the feed control loop.

Because of the limited effectiveness of the classical PID controller, the precontrol thus formed must fix the complicated temporal variation in the feedwater volume to a few percent exactly, with the result that the controller itself has to undertake only a fine correction with such a design, the achievable control quality is determined largely by the accuracy and reliability of the precontrol. Setting the function generator and the element for dynamic deformation therefore requires a high outlay, in particular for protracted commissioning. Since the precontrol must be performed iteratively, there is the further disadvantage that it is relatively inaccurate.

SUMMARY OF THE INVENTION

Accordingly, one object of the invention is to provide a novel device for precontrolling the feedwater of a cooling-air temperature controller for a cooling-air cooler which is used in power plants, which device operates very accurately and permits an accurate commissioning without iteration.

This is achieved according to the invention by virtue of the fact that in the case of a device in accordance with the preamble of claim 1 use is made as precontrolling element of a function element which has as inputs the signals corresponding to the air-outlet desired temperature, the air-inlet temperature, the air volume flow, the main steam pressure and the water-inlet temperature, and as outputs the approximated precontrolled feedwater volume flow and the controller gain. In this case, the signal of the air-outlet desired temperature is connected to a first input of a reference point of which a second input is connected to the output of a first temperature meter for the air-inlet temperature and whose output is connected to the first input of a first multiplier, it being the case, furthermore, that the output of the first temperature meter is connected to the input of a first function generator in which the relationship between the air-inlet temperature and the specific thermal capacity is fixed, and that the output of the first function generator is connected to the first input of a further multiplier, it being the case, furthermore, that the output of the temperature meter and the output of the main steam pressure gage are connected to the input of a second function generator in which the relationships between the air-inlet temperature, the main steam pressure and the steam-outlet enthalpy are fixed, and that the output of a second function generator is connected as a first input to a further reference point, it being the case that furthermore, the output of a further temperature meter for the water inlet temperature and the output of the main steam pressure gage are connected to the input of a third function generator, in which the relationships between the feedwater-inlet temperature, the main steam pressure and the water-inlet enthalpy are fixed, and that the output of the third function generator is connected as a second input to the second reference point and it being the case that, furthermore, the output of the second reference point is connected to the input of a maximum selector, to which a signal for the enthalpy difference limited to a minimum enthalpy is connected as further input, and that the output of the maximum selector is connected as first input to a divider, and that the output of the air volume flow meter is connected as second input to the divider, the output of the divider being connected as second input to the second multiplier, and the output of the second multiplier being connected, on the one hand, to the input of a dynamic time-delay element whose output supplies the controller gain for the cooling-air temperature controller, and being connected, on the other hand, as second input to the first multiplier, whose output supplies the signal for the approximated precontrolled feedwater volume flow, which is led to an addition point connected downstream of the controller.

The advantages of the invention are to be seen inter alia, in the elimination of the lead-lag element previously customary. As a result, the feedwater can be precontrolled in a substantially more accurate fashion. Commissioning is performed without iteration. It is possible to use the solution according to the invention as described above to precontrol the feedwater exactly, chiefly in part-load operation, that is to say in the case of temperature saturation.

It is particularly expedient when for operation of the system in the unsaturated temperature range of the above-described device there is additionally connected downstream of the first multiplier an addition point in which the signal for the approximated precontrolled feedwater volume flow is fed a correction signal.

Embodiments which are advantageous for this purpose are contained in the last two subclaims. It is possible by means of these variants to achieve accurate precontrol even in the case of unsaturated operation, because the precontrolling quantity or the correcting quantity itself is appropriately corrected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
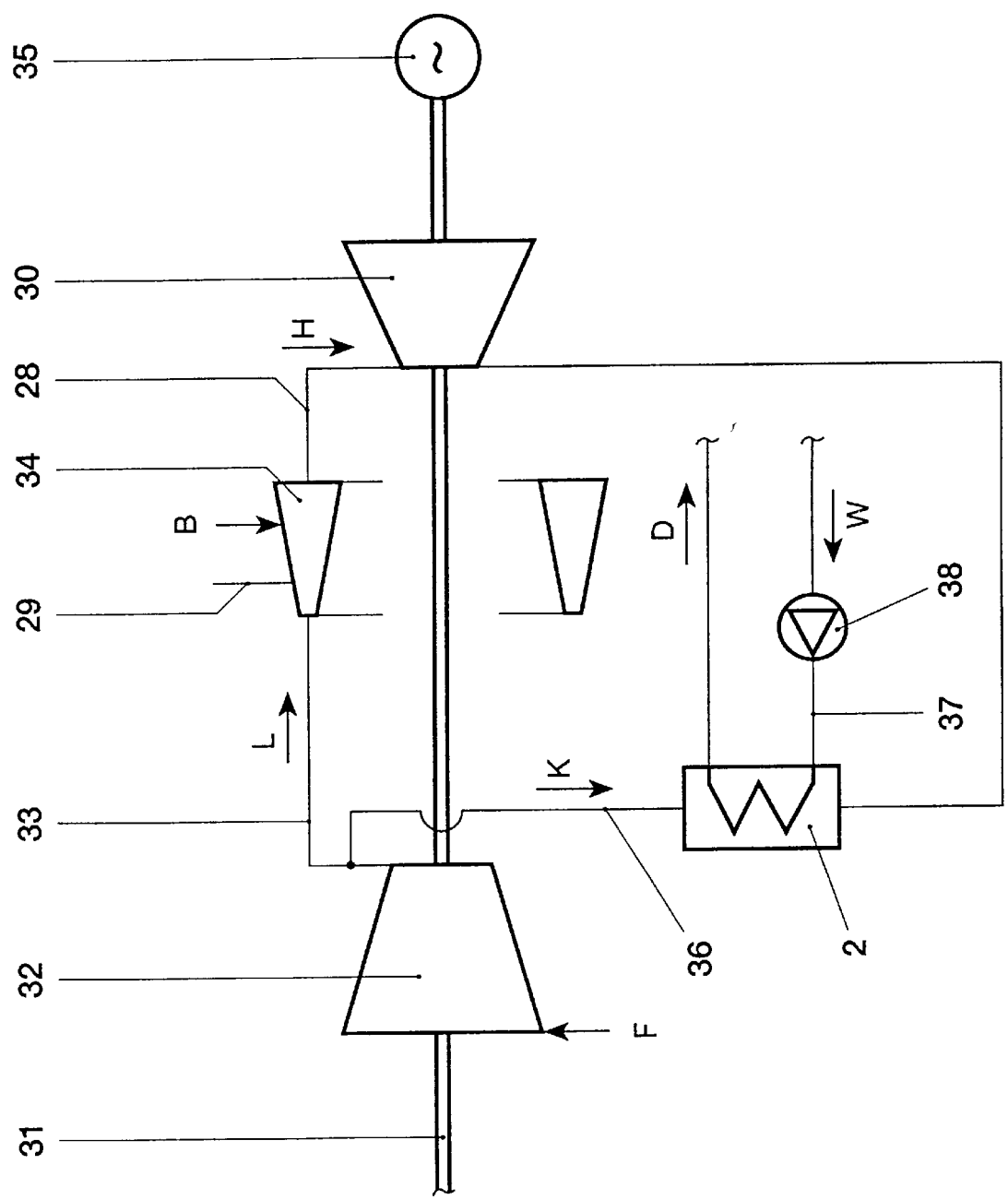
FIG. 1 shows a simplified diagrammatic representation of a gas turbine plant with a cooling-air cooler connected into a cooling-air line according to the present invention.

Referring now to the drawings, wherein only the elements essential for understanding the invention are shown, the flow direction of the working medium is denoted by arrows, and like reference numerals designate identical or corresponding parts throughout the several views, a diagrammatic representation of a gas turbine plant is shown as an overview in FIG. 1. This gas turbine plant comprises a gas turbine 30 having an upstream compressor 32, arranged on a common shaft 31, as well as a combustion chamber 34 arranged between the compressor 32 and the turbine 30 in a fresh-air line 33 coming from the compressor 32. The turbine 30 drives a generator 35 seated on the shaft 31. Branching off from the fresh-air line 33 is a cooling-air line 36 which opens into the gas turbine 30. A cooling-air cooler 2, which is a once-through forced-flow cooler, is connected on the primary side upstream of the gas turbine 30 into the cooling-air line 36. On the secondary side, the cooling-air cooler 2 is connected into a liquid-steam line 37, into which, for example, there is connected on the secondary side a steam generator (not represented here) which is connected on the primary side into the waste-gas line (not represented here) of the gas turbine 30. The steam D can then, for example, be fed for use into a heating grid. Another possibility (not represented) of using the heat produced during cooling of the cooling air K consists, for example in that the steam D generated is used to operate a steam turbine plant. For this purpose, the cooling-air cooler 2 is connected on the secondary side, for example as a preheater into the water-steam circuit (not represented) of the steam turbine plant.

During operation of the gas turbine plant, the combustion chamber 34 is fed fuel B through fuel line 29 which is burnt in the combustion chamber 34 with the compressed fresh air F coming from the compressor 32. The hot gas H produced during combustion is fed through hot gas line 28 into the turbine 30, expands there and in so doing drives the turbine 30 which, in turn, drives the compressor 32 and the generator 35. Since the hot gas H is at a very high temperature when entering the turbine 30, cooling of the turbine 30 is required. For this purpose, a portion of the compressed fresh air F is fed as cooling air K to the gas turbine 30 via the cooling-air line 36. The fresh air F is heated in the compressor 32 because of the compression, with the result that it must be cooled for the purpose of being used as cooling air K. The cooling air K is therefore firstly cooled in the cooling-air cooler 2 before being fed to the turbine 30. In accordance with FIG. 1, it flows from top to bottom and is in heat exchange with the liquid medium, which is preferably feedwater W, flowing through the tubes of the cooler 2 from bottom to top. The feedwater W is introduced into the cooling-air cooler 2 via the liquid-steam line 37 and via a pump 38 arranged in the line 37, absorbs heat from the air K flowing through the cooler 2 and cools the cooling air K in this way. The feedwater W is evaporated to form steam D in the process, assuming adequate heat transfer. The main steam D passes via the line 37 and, if appropriate, via further units which are not represented here, to a consumer (likewise not represented), for example a steam turbine.

In order to be able to operate the above-described plant optimally under different operating conditions, there is a need, inter alia, for a cooling-air temperature controller. This controller 1 is not included in FIG. 1 for reasons of clarity.

Figure 2:
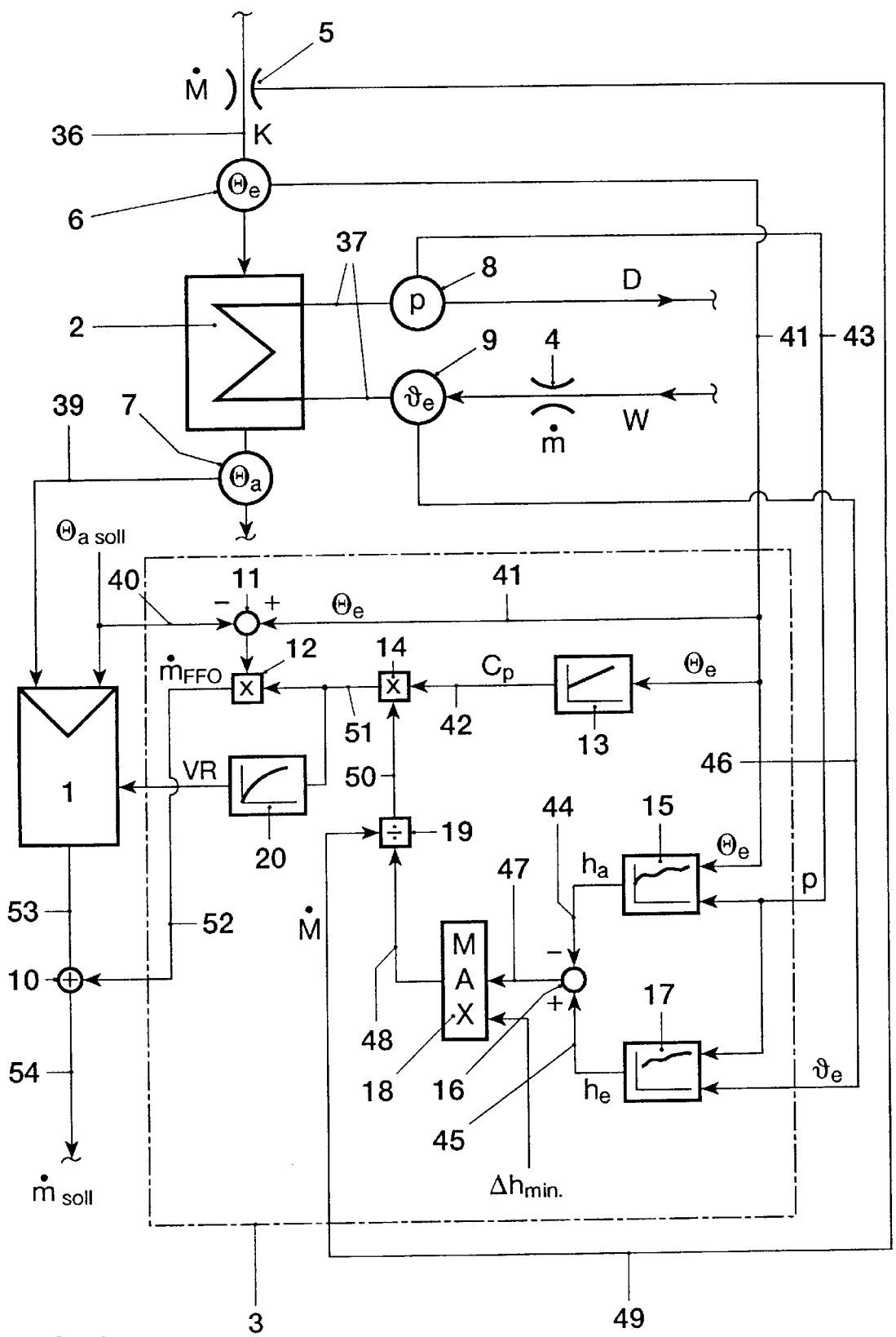
FIG. 2 shows a once-through cooling-air cooler with a cooling-air temperature controller which operates with feedwater precontrol.

FIG. 2 shows the above-described once-through forced-flow cooling-air cooler 2 with a cooling-air temperature controller 1 which can, for example, be a PI or a PID controller which operates using feedwater precontrol according to the invention by virtue of the fact that it is operationally connected to the function element 3, which has as inputs the, air-outlet desired temperature $\Theta_{a\ soll}$, the air-inlet temperature $\Theta_e$, the air volume flow M, the main steam pressure p and the water-inlet temperature $\theta_e$, and as outputs the approximated precontrolled feedwater volume flow $m_{FFO}$ and the controller gain VR.

In accordance with FIG. 2, there are arranged in the cooling-air line 36 upstream of the inlet of the cooling-air cooler 2 an air volume flow meter with a sensor 5 and a temperature meter with a sensor 6, said sensors being used to measure the air-inlet temperature $\Theta_e$ and the air volume flow M and transform into corresponding signals. Arranged at the outlet of the cooling-air cooler 2 in the cooling-air line 36 is a second temperature meter with a sensor 7, by means of which the outlet temperature $\Theta_a$ of the cooling air K is measured and a corresponding signal is generated.

Arranged upstream of the cooling-air cooler 2 in the liquid-steam line 37 is a water volume flow meter 4 and a temperature meter with a sensor 9 for the feedwater W, by means of which the feedwater volume flow m and the feedwater-inlet temperature $\theta_e$ are determined and converted into corresponding signals, while there is arranged downstream of the cooler 2 in the line 37 a main steam pressure gage with a sensor 8 in which the pressure p of the main steam D is measured and converted into a corresponding signal.

A signal line 39, which leads from the temperature meter 7 for the air-outlet temperature $\Theta_a$ to the controller 1, is connected as first input to the controller 1, while the signal corresponding to the desired outlet temperature $\Theta_{a\,soll}$ of the cooling air K from the cooling-air cooler 2 serves as second input. This signal is, in addition, fed via a signal line 40 to a reference point 11 and compared there with the signal, fed via a signal line 41, of the inlet temperature $\Theta_e$ of the cooling air K. The output of the reference point 11 is connected as first input of a multiplier 12.

Moreover, the signal corresponding to the air-inlet temperature $\Theta_e$ is connected as input via the signal line 41 to a function generator 13 in which the relationship between the specific thermal capacity $c_p$ and temperature $\Theta_e$ is fixed. The signal corresponding to the specific thermal capacity $c_p$ is connected as first input via a signal line 42 to a second multiplier 14.

Finally, the signal corresponding to the air-inlet temperature $\Theta_e$ is also connected as first input via the signal line 41 to a further function generator 15, the signal corresponding to the main steam pressure p and led up via the signal line 43 being connected as second input to the function generator 15. The relationships between the air-inlet temperature $\Theta_e$, the main steam pressure p and the steam-outlet enthalpy $h_a$ are fixed in the function generator 15. The signal corresponding to the steam-outlet enthalpy $h_a$ is fed via the signal line 44 to a reference point 16. The second input of this reference point 16 is the signal corresponding to the water-inlet enthalpy $h_e$, which is fed via a line 45 which starts at the output of a further function generator 17. The relationships between the main steam p, the water-inlet temperature $\theta_e$ and the water-inlet enthalpy $h_e$ are fixed in the function generator 17. The inputs of the function generator 17 are the signal corresponding to the main steam pressure p and fed via the line 43, and the signal corresponding to the water-inlet temperature $\theta_e$ fed via a signal line 46.

The output of the reference point 16 is connected via a signal line 47 to the input of a maximum selector 18, to which a signal for the enthalpy difference $\Delta h_{min}$ limited to minimum enthalpy is connected as further input. The larger of the respective input signals is selected in the selector 18. The output of the maximum selector 18 is connected via a line 48 to the first input of a divider 19, to which the signal corresponding to the air volume flow M and fed via a line 49 from the air volume flow meter 5 is connected as second input. The output of the divider 19 is connected as second input to the multiplier 14 via a line 50. The output of the multiplier 14 is, on the one hand, connected via a line 51 to the input of a dynamic time-delay element 20 whose output supplies the controller gain VR for the cooling-air temperature controller 1 and is, on the other hand, connected as second input to the multiplier 12, whose output supplies the signal for the approximated precontrolled feedwater volume flow $m_{FFO}$, which is led into an addition point 10 via a signal line 52. The addition point 10 is arranged in a signal line 53 coming from the output of the controller 1. The precontrolled signal according to the invention for the desired value of the feedwater volume flow is now present in the line 54 leading from the output of the addition point 10.

The relationships between the individual quantities which are realized by the above function element 3 can be represented mathematically by the following equation:

$$m_{FFo} = (\theta_e - \theta_{asoll}) \frac{Mc_p(\theta_e)}{h_a(\theta_e, p) - h_e(\phi_e, p)}$$

This control according to the invention of the feedwater precontrol holds true exactly only in the case of part-load operation, that is to say only in the range of temperature saturation. This becomes particularly plain on consideration of FIG. 3.

Figure 3:
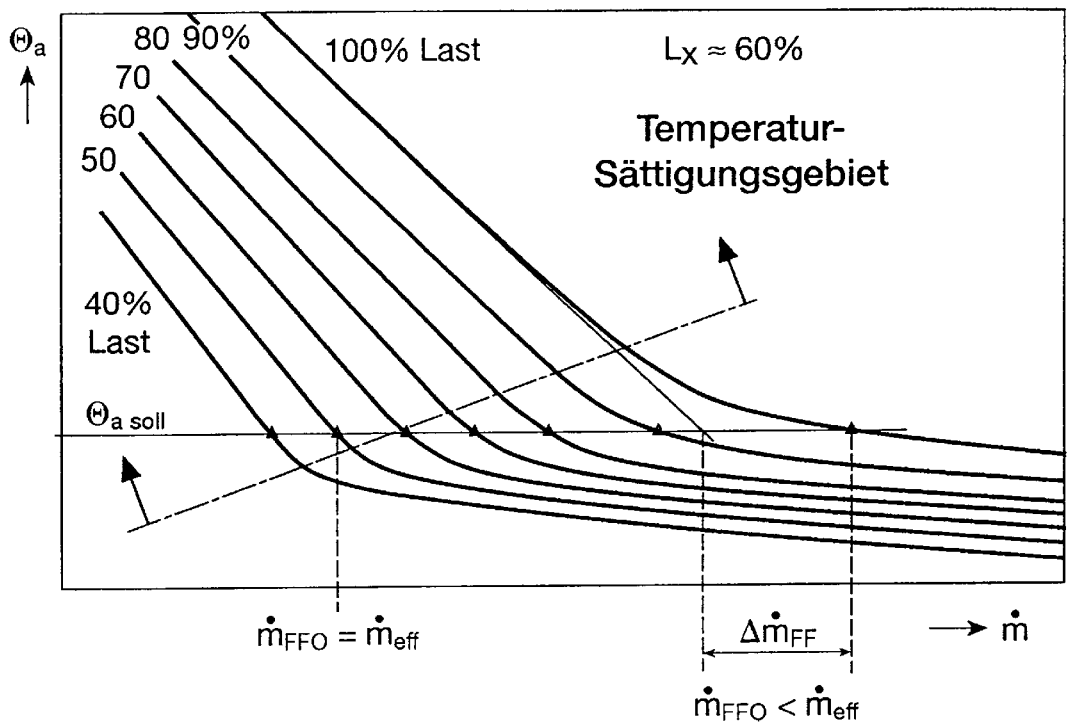
FIG. 3 shows the dependence of the air outlet temperature on the load and the feedwater volume flow.

The dependence of the cooling-air-outlet temperature $\Theta_a$ from the feedwater volume flow m is represented in FIG. 3 for different loads. It can be seen that the approximated precontrolled feedwater volume flow $m_{FFO}$ is equal to the effective feedwater volume flow $m_{eff}$ only in the temperature saturation zone. At 100% load, by contrast, there is a relatively large difference between these two values. There is a deviation $\Delta m_{FF}$ of the approximated precontrol signal of $m_{FFO}$ from the effective precontrol signal $m_{eff}$. Consequently, in accordance with the invention for such operating conditions, which do not lie in the temperature saturation range, the correction for the feedwater precontrol signal is introduced in order to render the invention more precise (see FIGS. 5 and 6).

The correction signals are the load L and the ambient temperature $T_U$, which also influences the precontrol signal. This is illustrated in FIG. 4.

Figure 4:
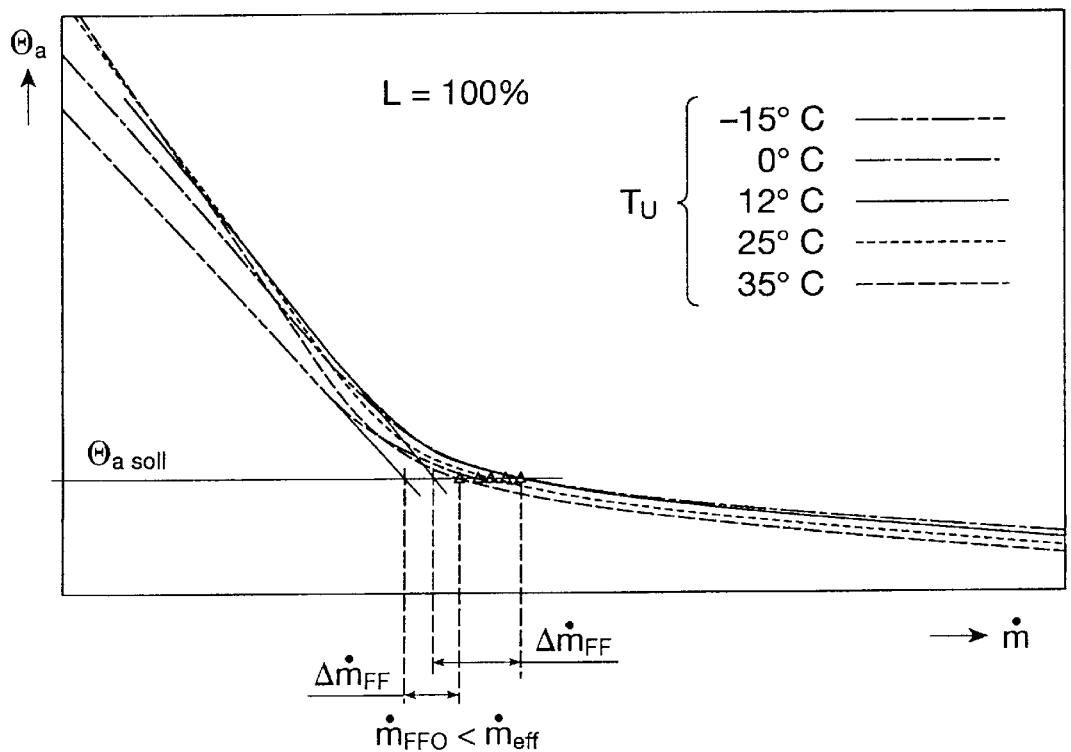
FIG. 4 shows the dependence of the air outlet temperature, in the case of a constant load, on the ambient temperature and the feedwater volume flow.

FIG. 4 shows the dependence of the cooling-air-outlet temperature $\Theta_a$ on the feedwater volume flow m and on the ambient temperature $T_U$ for a load of 100%. It may be seen that, for example, the difference $\Delta m_{FF}$ is substantially smaller for $T_U=-15°$ C. than this difference for $T_U=12°$ C.

Figure 5:
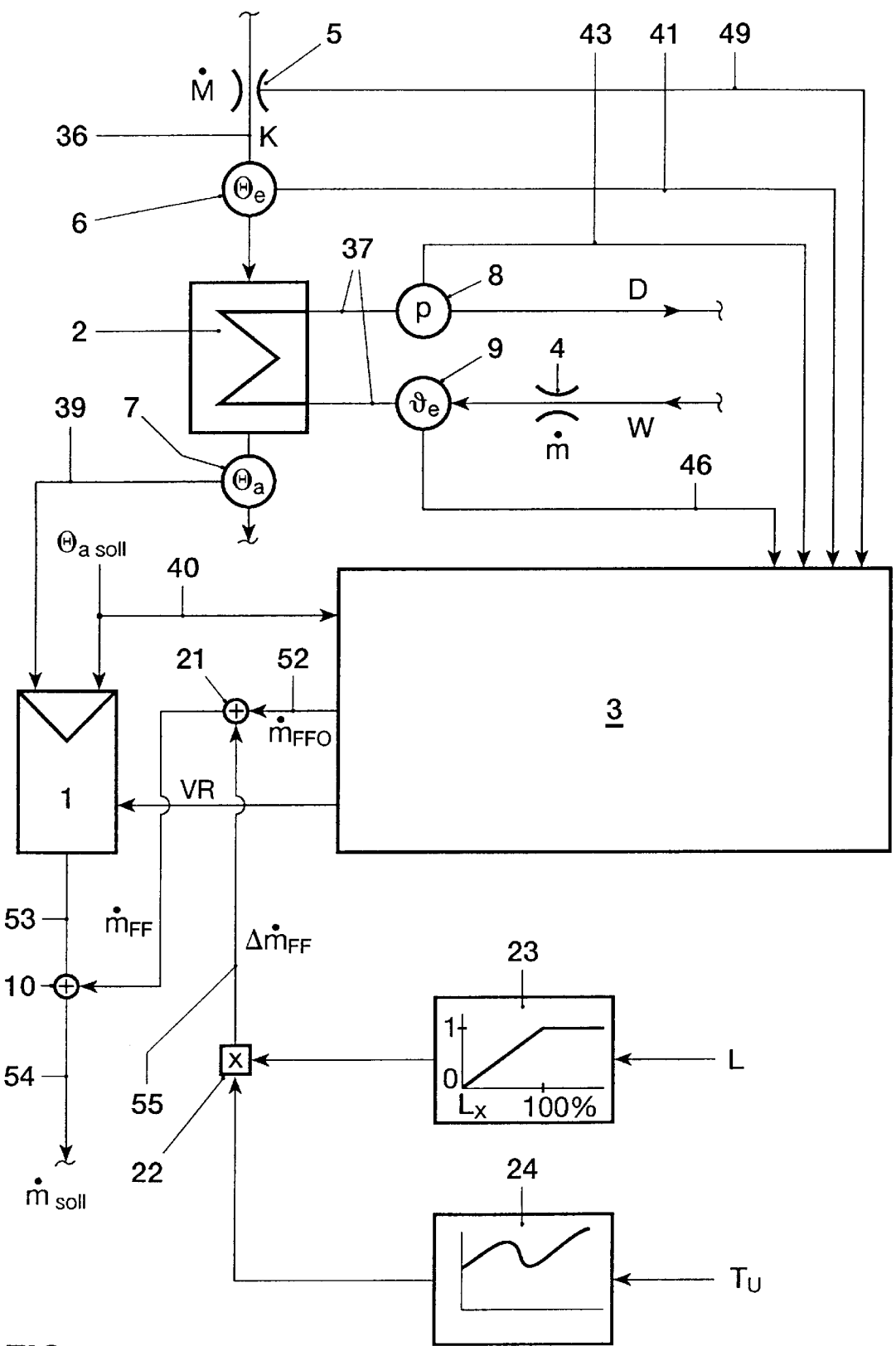
FIG. 5 shows a once-through cooling-air cooler with a cooling-air temperature controller which operates with corrected feedwater precontrol.

An appropriate device in which the feedwater precontrol signal is still corrected is illustrated in FIG. 5. The function element 3 is also designed here as represented in FIG. 2 and described above, and so there is no need once again to describe and represent the details of the function element 3. In addition to the variant embodiment according to the FIG. 2, there is arranged in the signal line 52 an addition point 21 to which the signal for the approximated precontrolled feedwater volume flow $m_{FFO}$ is connected as first input, and to which the signal, fed via a line 54, for the difference $\Delta m_{FF}$ between the effective feedwater volume flow $m_{eff}$ for $\Theta_a=\Theta_a$ $_{soll}$ and the approximated precontrolled feedwater volume flow $m_{FFO}$ is connected as second input. The signal for $\Delta m_{FF}$ is formed in a multiplier 22, arranged in the line 55, whose input quantities are the output signals of two function generators 23 and 24. The relationship between the difference $\Delta m_{FF}$ and the load L is fixed in the function generator 23. Thus, for example, the value zero holds true for loads which are within the temperature saturation range ($L \leq L_x$), because there is no need at all to correct the precontrol signal in these cases, while the value 1 holds true for a load of 100% (largest correction required). The relationship between the difference $\Delta m_{FF}$ and the ambient temperature $T_U$ is fixed in the function generator 23.

A more accurate precontrol of the feed flow in the unsaturated temperature range is achieved with the aid of the device just described, since the signal for the approximated precontrolled feedwater volume flow $m_{FFO}$ is matched to the respective load conditions and temperature conditions.

Figure 6:
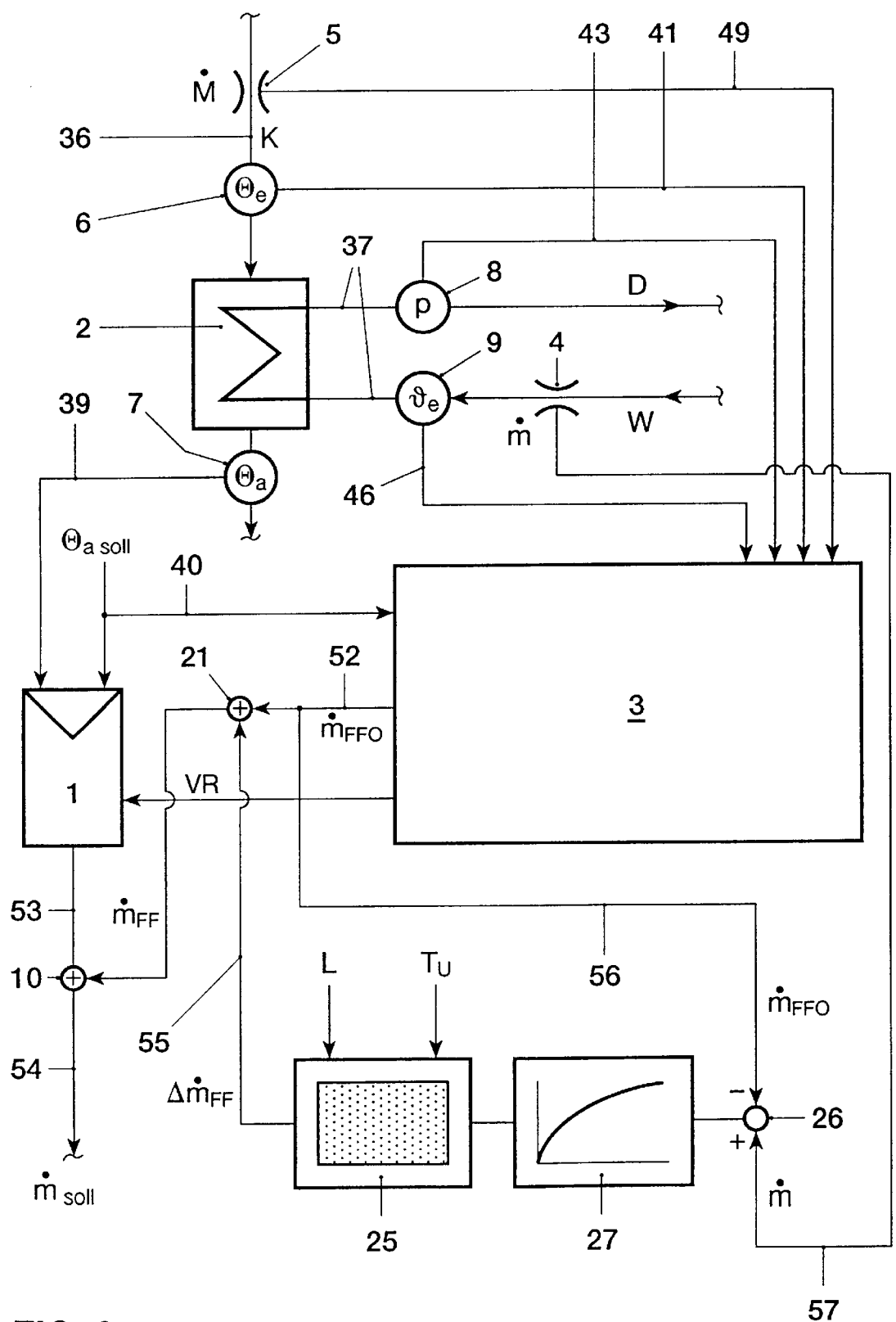
FIG. 6 shows a once-through cooling-air cooler with a cooling-air temperature controller which operates with a further variant embodiment of corrected feedwater precontrol.

FIG. 6 shows a further exemplary embodiment. The controller illustrated in FIG. 6 operates in a particularly exact fashion in the unsaturated range of the cooling-air cooler, since a more accurate correction signal is supplied here. The device is constructed as follows: The function element 3 is constructed as described in FIG. 2, and therefore has five inputs, specifically the signals for the air-outlet desired temperature $\Theta_{a\ soll}$, the respective air-inlet temperature $\Theta_e$, the air volume flow M, the water-inlet temperature $\theta_e$ and the main steam pressure p, and two outputs, specifically the signals for the approximated feedwater volume flow $m_{FFO}$ and the controller gain VR. A line 56 which ends at a reference point 26 branches off from the signal line 52 for the approximated feedwater volume flow $m_{FFO}$. A signal line 57 also leads to the reference point 26 from the feedwater volume flow meter with the sensor 4. The differential signal is fed via a time-delay element 27 to a function generator 25 in which $\Delta m_{FF}$ is stored as a function of the load L and the ambient temperature $T_U$. A comparison with the current load and ambient temperature delivers as output a signal for the correction quantity $\Delta m_{FF}$, which is fed via the signal line 55 to the addition point 21 arranged in the line 52. The second input of the addition point 21 is the signal for the approximated feedwater volume flow $m_{FFO}$. The output of the addition point 21 supplies the corrected precontrol signal $m_{FF}$, which is connected to the addition point 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for precontrolling the feedwater quantity of a cooling-air temperature controller (1) for a once-through cooling-air cooler (2) in power plant systems, it being the case that in the cooling-air cooler (2) compressed air (K) from a compressor (32) is cooled and feedwater (W) is heated and evaporated, and that an air volume flow meter with a sensor (5), and a temperature meter with a sensor (6) are arranged upstream of the inlet of the air (K) into the cooling-air cooler (2), and that a further temperature meter with a sensor (7), whose output is connected to the controller (1) in addition to the air-outlet desired temperature ($\theta_{a\ soll}$), is arranged downstream of the outlet of the air (K) from the cooling-air cooler (2), as well as that a main steam pressure gage with a sensor (8) is arranged at the outlet of the cooling-air cooler (2), and a temperature meter with a sensor (9) for the feedwater (W) is arranged at the inlet into the cooling-air cooler (2), and that at an addition point (10) connected downstream of the cooling-air temperature controller (1) a signal corresponding to the desired value of the feedwater volume flow ($m_{soll}$) is provided to a feedwater control circuit as a precontrol, wherein the device comprises a function element (3), which has as inputs the signals corresponding to the air-outlet desired temperature ($\theta_{a\ soll}$), the air-inlet temperature ($\theta_e$), the air volume flow (M), the main steam pressure (p) and the water-inlet temperature ($\theta_e$) and has as outputs the signal of the approximately precontrolled feedwater volume flow ($m_{FFO}$), which is connected to the addition point (10), and the signal of the controller gain (VR), which is connected to the cooling-air temperature controller (1), it being the case that the signal of the air-outlet desired temperature ($\theta_{a\ soll}$) is connected at a first input to a reference point (11), which is connected at a second input to the output of the temperature meter (6) and whose output is connected to the first input of a multiplier (12), it being the case, furthermore, that the output of the temperature meter (6) is connected to the input of a function generator (13) in which the relationship between the air-inlet temperature ($\theta_e$) and the specific thermal capacity ($C_p$) is fixed, and that the output of the function generator (13) is connected to the first input of a further multiplier (14), it being the case, furthermore, that the output of the temperature meter (6) and the output of the main steam pressure gage (8) are connected to the input of a function generator (15) in which the relationships between the air-inlet temperature ($\theta_e$), the main steam pressure (p) and the steam-outlet enthalpy ($h_a$) are fixed, and that the output of the function generator (15) is connected as a first input to a reference point (16), it being the case, furthermore, that the output of the temperature meter (9) and the output of the main steam pressure gage (8) are connected to the input of a further function generator (17), in which the relationships between the water-inlet temperature ($\theta_e$), the main steam pressure (p) and the water-inlet enthalpy ($h_e$) are fixed, and that the output of the function generator (17) is connected as a second input to the reference point (16) and it being the case, furthermore, that the output of the reference point (16) is connected to the input of a maximum selector (18) to which a signal for the enthalpy difference ($\Delta h_{min}$) limited to a minimum enthalpy is connected as further input, and that the output of the maximum selector (18) is connected as first input to a divider (19), and that the output of the air volume flow meter (5) is connected as second input to the divider (19), the output of the divider (19) being connected as second input to the multiplier (14), and the output of the multiplier (14) being connected, on the one hand, to the input of a dynamic time-delay element (20) whose output supplies the controller gain (VR) for the cooling-air temperature controller (1), and being connected, on the other hand, as second input to the multiplier (12), whose output supplies the signal for the approximated precontrolled feedwater volume flow ($m_{FFO}$).

2. The device as claimed in claim 1 for precontrolling the feedwater quantity of a cooling-air temperature controller (1) for a cooling-air cooler (2) wherein for operation of the system in the unsaturated temperature range there is connected downstream of the multiplier (12) an addition point (21) in which the signal for the approximated precontrolled feedwater volume flow ($m_{FFO}$) is fed a correction signal ($\Delta m_{FF}$).

3. The device as claimed in claim 2, wherein the correction signal ($\Delta m_{FF}$) represents the output of a multiplier (22) whose first input is connected to the output of a first function generator (23), the load (L) serving as input of the function generator (23) and the relationship between the load (L) and the difference ($\Delta m_{FF}$) between the effective feedwater volume flow ($m_{eff}$) for $\Theta_a = \Theta_{a\ soll}$ and the approximated precontrolled feedwater volume flow ($m_{FFO}$) being fixed in the function generator (23), and the second input of the multiplier (22) is connected to the output of a second function generator (24), the ambient temperature ($T_U$) serving as input of the function generator (24) and the relationship between the ambient temperature ($T_U$) and the difference ($\Delta m_{FF}$) between the effective feedwater volume flow ($m_{eff}$) for $\Theta_a = \Theta_{a\ soll}$ and the approximated precontrolled feedwater volume flow ($m_{FFO}$) being fixed in the function generator (24).

4. The device as claimed in claim 2, wherein the correction signal ($\Delta m_{FF}$) represents the output of a function generator (25) in which the relationship between the load (L), the ambient temperature ($T_U$) and the difference ($\Delta m_{FF}$) between the effective feedwater volume flow ($m_{eff}$) for $\Theta_a = \Theta_{a\ soll}$ and the approximated precontrolled feedwater volume flow ($m_{FFO}$) is determined, and to which there is connected as first input the ambient temperature ($T_U$), as second input the load (L) and as third input the difference, formed at a reference point (26) and led via a downstream time-delay element (27), between the feedwater volume flow (m) and the approximated precontrolled feedwater volume flow ($m_{FFO}$).

* * * * *